(12) United States Patent
Schmidt

(10) Patent No.: US 6,344,227 B1
(45) Date of Patent: Feb. 5, 2002

(54) DOUGH FEEDER WIPER AND METHOD OF USE

(75) Inventor: Norman Gunther Schmidt, Burnaby (CA)

(73) Assignee: Norman G. Schmidt, Burnaby (CA)

( * ) Notice: Subject to any disclaimer, the term of this patent is extended or adjusted under 35 U.S.C. 154(b) by 0 days.

(21) Appl. No.: 09/515,623

(22) Filed: Feb. 29, 2000

Related U.S. Application Data

(60) Provisional application No. 60/122,871, filed on Mar. 5, 1999.

(51) Int. Cl.⁷ .................................................. A21D 6/00
(52) U.S. Cl. ..................... 426/503; 222/148; 222/272; 425/225; 425/227; 425/238
(58) Field of Search ................................ 425/227, 229, 425/238, 241, 225, 289; 222/272, 281, 148; 426/503, 504; 264/39, 138

(56) References Cited

U.S. PATENT DOCUMENTS

| | | | | |
|---|---|---|---|---|
| 4,211,492 A | * | 7/1980 | Konig et al. ................. | 222/272 |
| 4,811,864 A | * | 3/1989 | Balmer ......................... | 222/148 |
| 5,427,515 A | * | 6/1995 | Muller et al. ................ | 425/238 |
| 5,733,583 A | * | 3/1998 | Muller ......................... | 425/238 |
| 5,811,145 A | * | 9/1998 | Morikawa ..................... | 425/241 |
| 5,824,349 A | * | 10/1998 | Muller ......................... | 425/238 |
| 5,919,495 A | * | 7/1999 | Fletcher et al. .............. | 425/238 |
| 6,045,840 A | * | 4/2000 | Morikawa et al. ........... | 425/363 |

FOREIGN PATENT DOCUMENTS

DE  3444085 A1 * 6/1986 .................. 425/238

* cited by examiner

*Primary Examiner*—Robert Davis

(57) ABSTRACT

A device for wiping the surfaces or rotors used to portion mixed materials. The device removes adhering materials, such as cookie dough, from the cutting or metering surfaces. Typical application is for use in large automated bakeries or cookie manufacturers wishing to transport larger slabs or chunks of cookie dough from a mixer to machines which portion the dough prior for baking or freezing. The device has a wiper located proximate to the rotors. The device then moves the wiper along the rotors to release the adhering materials.

16 Claims, 4 Drawing Sheets

DOUGH FEEDER WIPER AND METHOD OF USE

This application claims the benefit of U.S. Provisional Application No. 60/122,871, filed Mar. 5, 1999.

BACKGROUND OF INVENTION

In large commercial bakeries there exist machines that mix ingredients to produce dough or mixed materials for baked goods such as bread, rolls, pizza, pastry etc. The larger designs of these machines have an elevated bowl where the materials are mixed. This larger design allows for removal of the dough by rotation of the bowl about a horizontal axis. The final height of the mixer's bowl(s) lower edge is typically 2 to 4 feet above the ground.

The discharged mixed material must then be moved to machines or points for further processing and eventual production into a final product. Standard procedure is to either directly discharge the dough into the next processing machine or to transport the dough to the next processing machine. Transport can be accomplished by discharge of the mixed materials into a wheeled container, which is then moved to the required machine or location where it is hoisted and discharged or metered into the processing machinery. Another method of transport is to discharge the mixed material into a machine which will transport this mixed material to the required processing machine. Transport of the mixed material is usually accomplished by pumping it through pipes or metering it out and transporting it by conveyors. Typically the type of transport is determined by are typically the characteristics of the material. Fluid materials such as creme fillings or jams are moved by wheeled container or by pumping. More viscous materials such as dough products are typically moved by wheeled containers or by an auger metering it and then transporting it by conveyor.

The transport by wheeled container is typically the most labour intensive. With batch sizes approaching 4000 pounds per mix, the risk of personel strains or injury is high. A relatively new and commercially successful method of automatically transporting mixed materials is to meter the mixed material through a pair of counter rotating cutting rotors which produce a log shaped strip of material which can then be conveyed to the required destination. This works well with materials which do not adhere to the rotors. However, problems occur with certain types of materials which are soft and sticky. In these cases, the material often does not release off of the rotors and the rotors become clogged and passage of the material stops. Examples of these materials are Oatmeal Raisin and Macaroon cookie dough which have both high fat and sugar content.

To maintain operation of these machines a method and machine are required that will keep the materials from adhering to the rotors. Methods presently in use include using non stick or low adhesion coatings such as teflon on the rotors, and continuous or pulse spray coating application of release agents, such as oils and or lecithin.

The apparatus and method described here in are a mechanical solution where the rotors are stripped of dough by the wiping action of a wiper, preferably a wiper rod and/or scraper, which passes down the length of the rotors.

SUMMARY OF INVENTION

The invention is a mechanical means of stripping mixed materials, typically cookie dough from the cutting rotors of automated mixed ingredient handling machinery. Here specifically, the preferred embodiment of the invention comprises a scrapping or stripping device driven parallel to the axis of the rotors and along the surfaces of the cutting or metering rotors to cause the adhering mixed material to drop to a discharging conveyor.

Use of described invention would allow for removal of adhering dough material to rotors of typical dough handling machines.

Use of described invention would provide consistant stripping of adhesive dough materials from the surfaces of the cutting rotors.

Use of wiper bar wound wipe materials that would adhere to the rotors and cause them to drop onto a conveyor located below.

Use of wiper bar would maintain material flow.

Wiper bar/scraper is a unique way to keep rotors unclogged.

Wiper bar and travel thereof are unique and allows rotors to be cleaned and maintain material flow.

Operation of wiper bar/scraper not restricted to use of given or illustrated example drive systems.

DESCRIPTION OF INVENTION

A mixed material handling machine typically operates by having a hopper with two matching rotors in the bottom of the hopper. These rotors counter rotate thereby entraining mixed material within the cavities of the rotors as seen in FIG. 1. The diameter of the rotors and the open area between the blades of the rotors determining the amount of dough that may be entrained per revolution. The rotation of these rotors being intermittent. Upon the start of the cutting or metering cycle the rotors will rotate until two matching blades come together to pinch off the metered amount of material from the material contained within the hopper above the rotors. Typically when the rotors reach the point where the two mating blades form a straight line to each other the gravitational force pulling the metered amount of material will be sufficient to cause the metered amount of material to pull away from the surface of the rotors and fall to the conveyor below.

However with high adhesion doughs or mixed materials, such as oatmeal raisin, two possibilities may arise to prevent the dough from pulling away from the rotors. First, the high adhesion may prevent the dough from releasing and the dough then stays on the rotor(s). Second, the low tensile strength or low cohesive nature of the dough allows part of the dough to adhere to the rotors with only part or portions of the dough dropping to the discharge conveyor. With either case the rate of dough deposit results in a subsequent transportation decrease to below what is required by the processing machinery. The condition may progress to where the rotors become totally clogged and all dough passage effectively stops.

To prevent the clogging condition in the instant invention a wiper, preferably a wiper rod, is shaped to the contour of the rotor faces and driven the length of the rotors on a path parallel to the rotational axis of the rotors.

DETAILED DESCRIPTION OF THE PREFERRED EMBODIMENTS OF THE DRAWINGS

Figure 1:
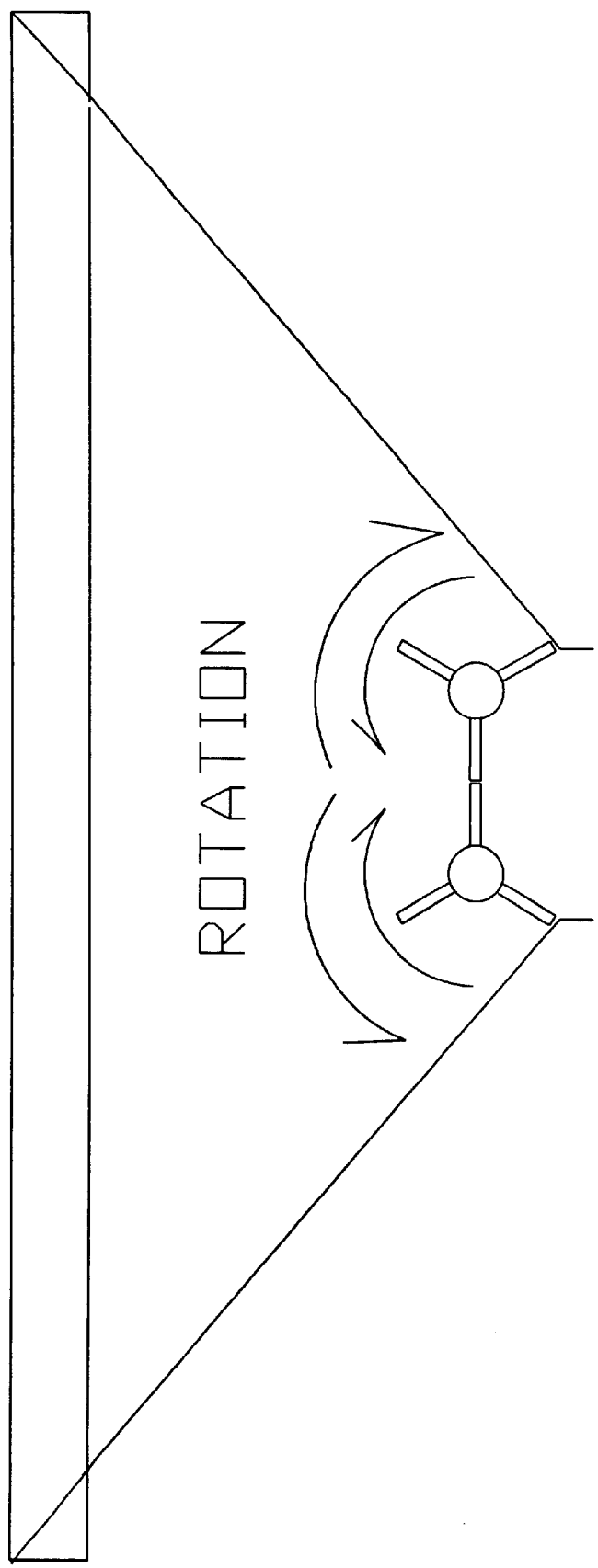
FIG. 1 shows an end view of a conventional metering machine.
Figure 2:
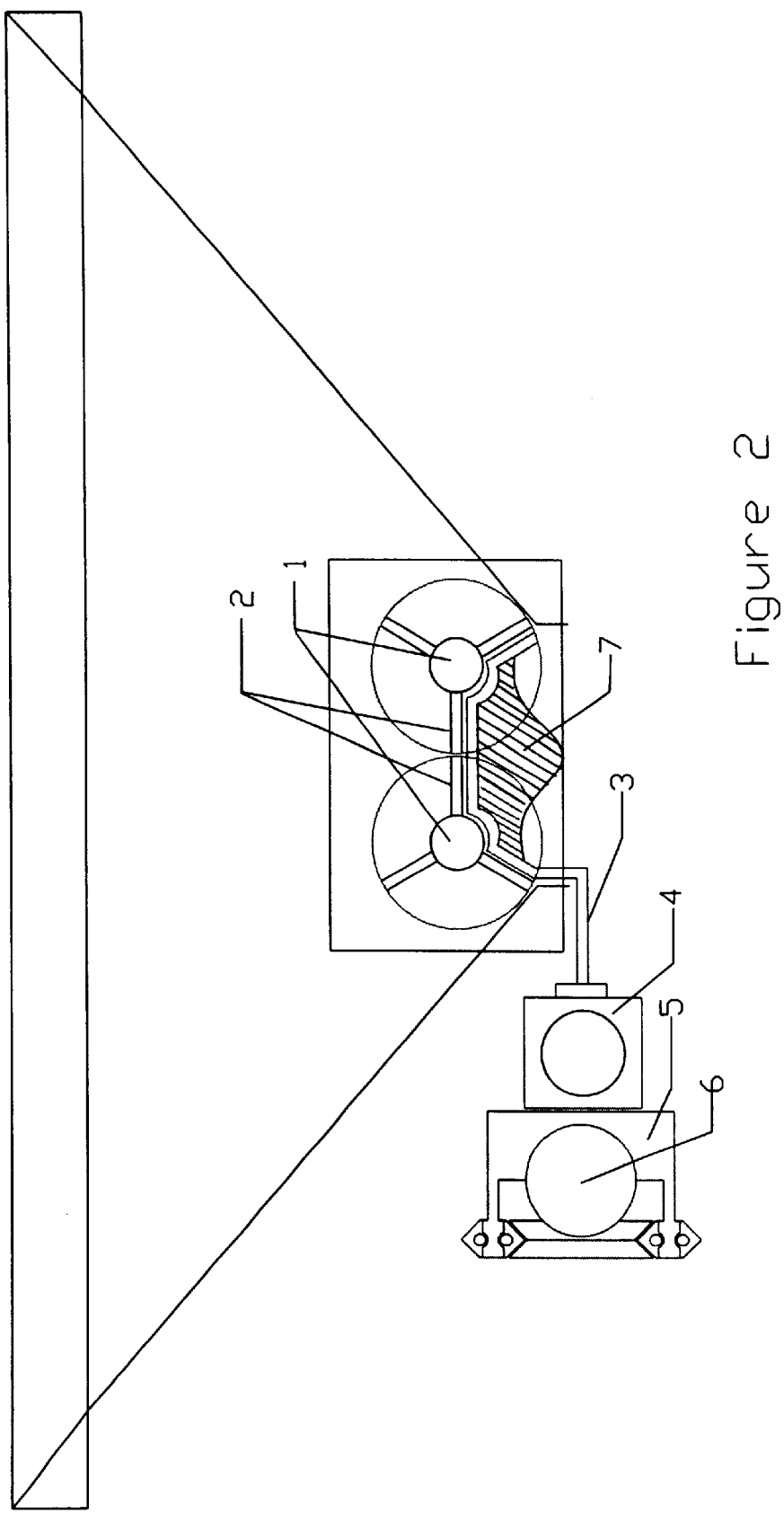
FIG. 2 shows the metering machine of FIG. 1 with an embodiment of the instant invention.

Referring to FIG. 1, when the metering machine cycles, the cutting rotors (1) will rotate 120 degrees, typically with the left hand rotor rotating clockwise and the right hand rotor rotating counter-clockwise. (operation may also be in opposite direction) This movement causes a volume of material from the hopper above the rotors to become entrained, which then passes through and occupies area 7 of FIG. 2. Non-adhering material may then drop to the discharge conveyor below. To remove the remaining adhering material a wiper, shown here as a preferred wiper rod (3), which is formed to the contour or shape of the cutting rotors (1) travels the length of the rotors (1) causing the adhering material to be pulled off of the rotors (1). The action of the wiping rod (3) imparts a combination of a shearing action along the rotor surface and/or a cutting action to remove the adhering material where the rod (3) would cause the soft adhering material to part and pass around the wiper rod. The void created by the rod's passing causes the material to not re-adhere, but fall to the discharge conveyor below. The action of the wiper rod is shown in FIG. 2, where a clearance is maintained between the wiper rod and the rotors so that the wiper bar does not come in contact with the rotors. Alternately the rod may have either a hard or soft faced scraper (not shown) which would maintain contact with the rotor surface to remove all of the adhering material.

Figure 3:
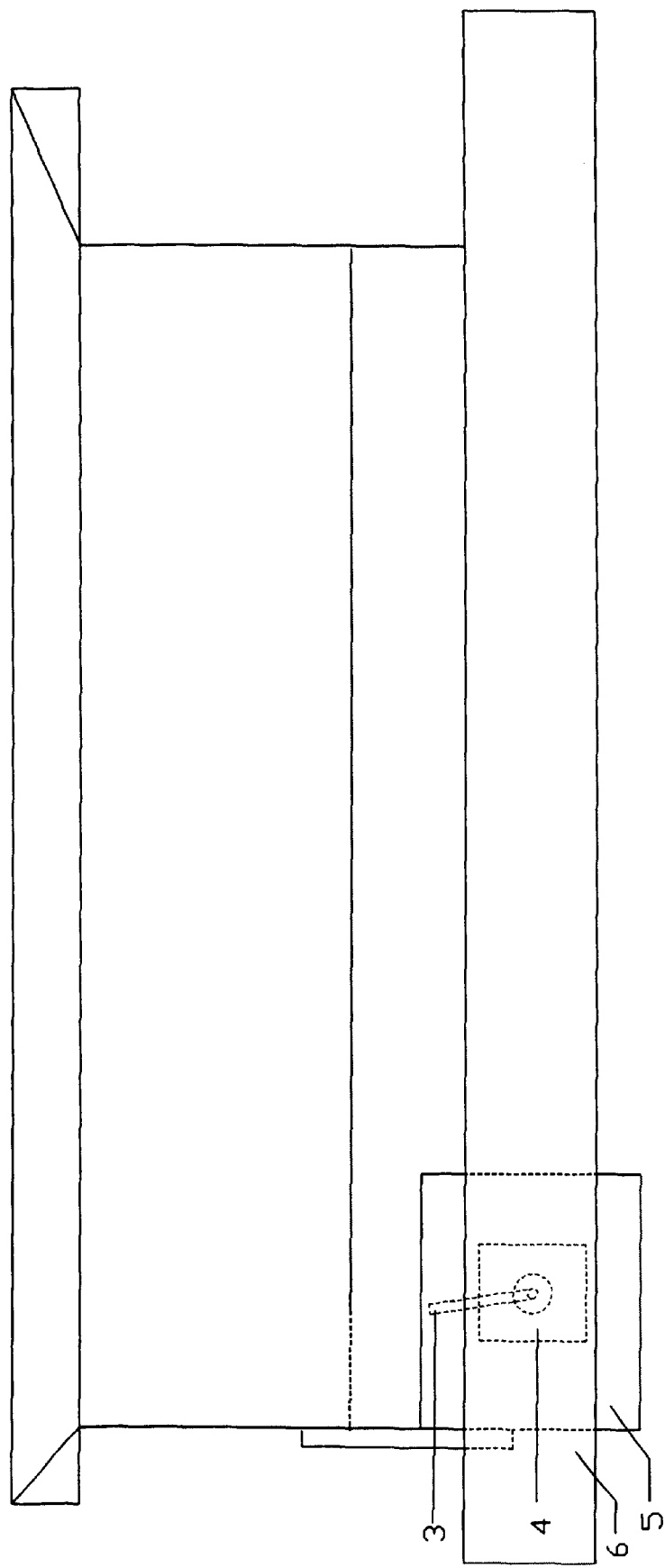
FIG. 3 shows a side view of the embodiment of the invention in FIG. 2, the wiper in a upward position.
Figure 4:
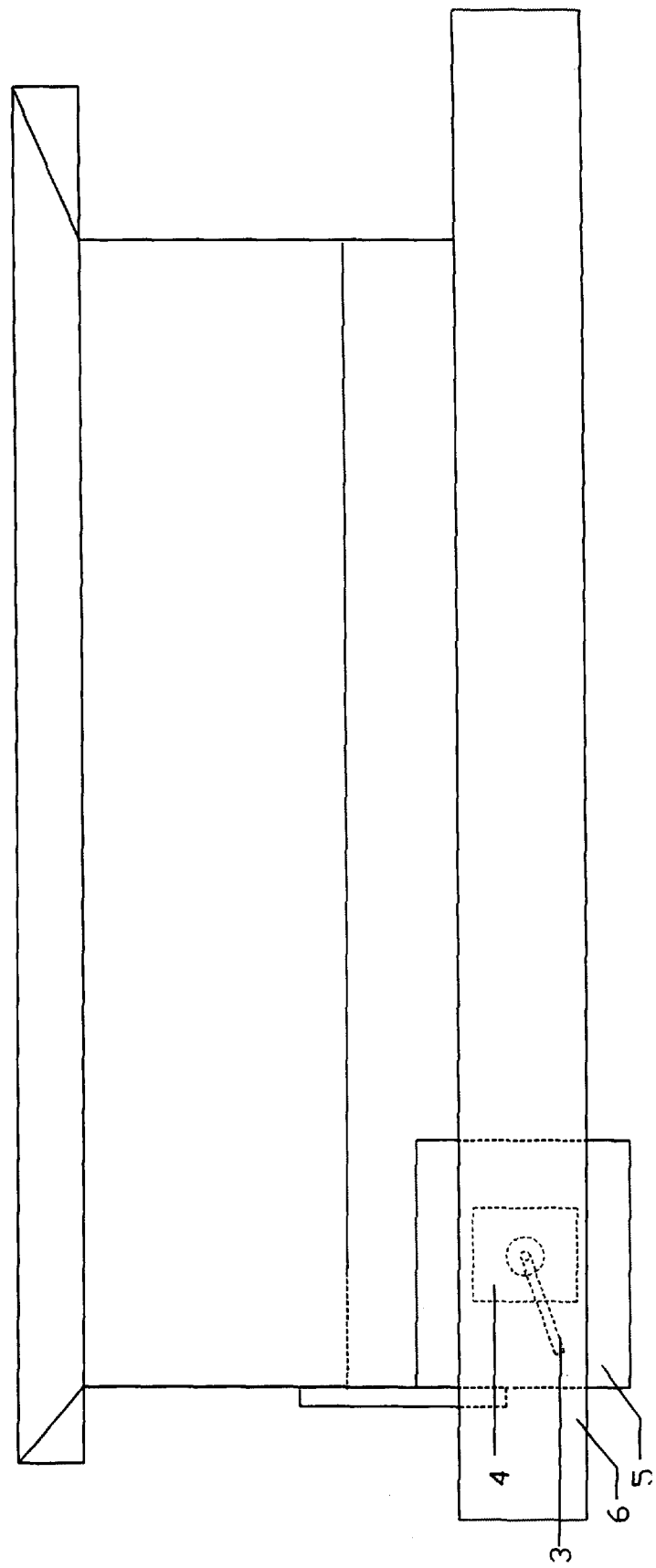
FIG. 4 shows a side view of the embodiment of the invention in FIG. 2, wiper in a downward position.

Movement of the wiper rod (3) is preferably by means of a carriage and a mechanical driver. In the embodiment shown the travel carriage (5) is a tracked carriage driven by a rodless air cylinder (6) both of these parts being commercially available. The system shown in FIG. 2 also utilizes a preferred rotary actuator (4) which provides for rotation of the wiper rod (3), so that it is not in a position to contact the cutting rotors (1) during rotation of the cutting rotors. The rotary actuator (4) would rotate the wiper rod (3) down, as shown in FIG. 4, so as to allow rotation of the cutting rotors without having the cutting rotors strike the wiper rod. Normal travel of the wiper rod (3) is then in the raised position, as seen in FIGS. 2 and 3.

In other variations of this system, the wiper is rigidly mounted to the travel carriage so that the carriage travels taking the wiper rod to a point beyond the end of the rotor cutting surfaces to ensure there is no mechanical contact of the rotors and the wiper rod (3). Through the use of the preferred embodiment the apparatus and its method of operation or any described alternate methods, the adhering material or major portion of adhering materials would be removed. The significance of the invention is that by having a wiper rod or scraper travel along the rotors the sticky dough is removed.

The disclosure herein is of only a single embodiment of the improvement which is the focus of the present invention and it is for illustrative purposes only. It is to be understood that various changes and modifications may be made to the disclosed device by one of ordinary skill in the arts without departing from the spirit of the invention or the scope of the claims.

I claim:

1. A mixed material handling apparatus comprising:
   a hopper;
   at least one pair of matching cutting rotors contained within the hopper, said rotors having a number of matching blades, wherein rotation of the blades towards one another causes material to be pinched and metered between the matching blades; and
   a wiper.

2. The mixed material handling apparatus of claim 1, wherein said rotors are located at the bottom of the hopper.

3. The mixed material handling apparatus of claim 1, wherein said wiper is a wiper rod.

4. The mixed material handling apparatus of claim 1, wherein said wiper is formed to the contour of the set of cutting rotors.

5. The mixed material handling apparatus of claim 3, wherein said wiper rod is formed of a flexible material to the contour of the set of cutting rotors.

6. The mixed material handling apparatus of claim 1, wherein said wiper mounts a contact surface for contacting said rotors.

7. The mixed material handling apparatus of claim 6, wherein said surface is comprised of soft material.

8. The mixed material handling apparatus of claim 1, wherein the wiper rotates up and down on an axis perpendicular to that of the said cutting rotors.

9. The mixed material handling apparatus of claim 1, wherein the wiper is mounted in a fixed position, whereby when a wiping operation is complete the wiper moves past the area where the rotors rotate, allowing for rotation of the rotors without said rotors contacting said wiper.

10. A method of metering mixed materials, comprising the steps of:
   providing a mixed materials handling apparatus having at least one pair of matching cutting rotors, said cutting rotors having a number of matching blades;
   rotating the matching blades to cause said mixed materials to be pinched and metered between the matching blades; and
   wiping the mixed materials by moving a wiper.

11. The method of claim 10, further comprising the step of rotating the wiper up to wipe the rotors and down to allow rotation of the rotors without said rotors striking said wiper.

12. The method of claim 10, further comprising the step of moving the wiper past an end of the rotors to allow for rotation of the said rotors without said rotors striking said wiper.

13. A mixed material handling apparatus comprising:
   a means for metering mixed materials,
   a means for wiping mixed materials from said means for metering and a means for moving said wiping means thereby causing the mixed material to be removed from said means for metering.

14. The apparatus of claim 13, wherein the means for wiping passes close to a surface of said mixed materials metering means causing adhering materials to be removed.

15. The apparatus of claim 13, wherein said means for wiping contacts a surface of said mixed materials metering means, without causing damage to the surface of said mixed materials metering means, as said means for wiping travels the length of said mixed materials metering means to remove adhering materials from the surface of said mixed materials metering means.

16. The apparatus of claim 1, further comprising a travel carriage which moves the wiper along the length of the rotors causing adhering material to be pulled off of the rotors.

* * * * *